Oct. 9, 1951    H. R. LARSEN ET AL    2,570,568
SPINDLE BEARING FOR SURVEYING INSTRUMENTS
Filed May 5, 1947
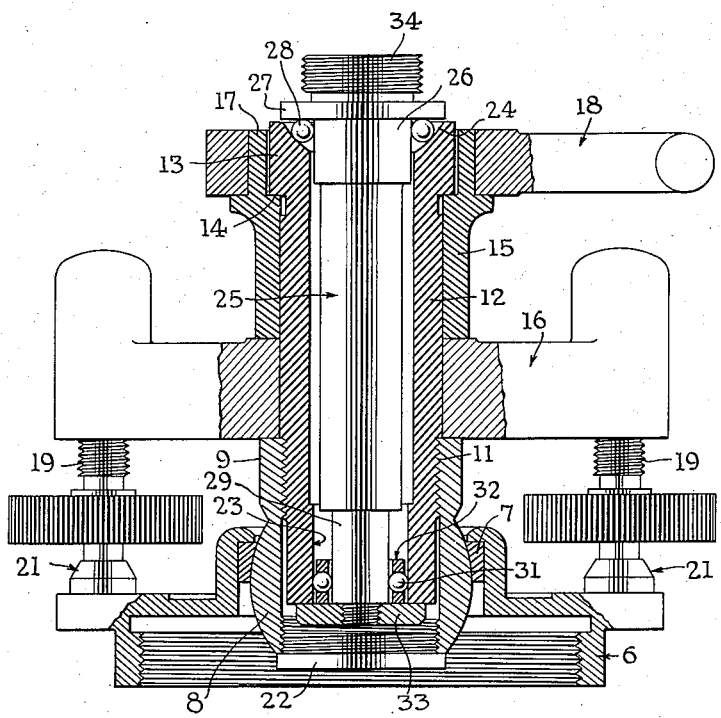
Inventor
Harold R. Larsen
and Daniel Gurney
Attorneys Patented Oct. 9, 1951

2,570,568

UNITED STATES PATENT OFFICE 2,570,568

SPINDLE BEARING FOR SURVEYING INSTRUMENTS

Harold R. Larsen, Troy, and Daniel Gurney, Jamestown, N. Y., assignors to W. & L. E. Gurley, Troy, N. Y., a corporation of New York Application May 5, 1947, Serial No. 745,930

5 Claims. (Cl. 308—189)

This invention relates to surveying instruments and particularly to the so-called spindle bearing which defines the vertical geometrical axis of the instrument.

Since the problem is to produce a precise bearing on which the telescope turns, it is simpler to explain the invention as embodied in a level. The invention can, however, be used in connection with more complicated instruments, such as transits and theodolites. The added complication in connection with instruments of the types just mentioned arises from the presence of a second and coaxial bearing which supports the horizontal limb. Since that second bearing is not involved in the present invention, nothing is sacrificed by disclosing the invention as used in a level.

The invention contemplates the use of ball bearings for the spindle, one bearing being mounted at the upper end of the spindle and the other at the lower end. According to the invention, the lower bearing is of the preloaded cylindrical race type. Within a narrow limit, such a bearing is indifferent to misalignment. The upper bearing may be of the same type, in which event a thrust bearing is needed, or as described and claimed in our divisional application Ser. No. 176,232 filed July 27, 1950, it may be of the combined radial and thrust type, in which event the races should be so designed that the bearing is free to assume its own alignment without prejudice to its accuracy. The drawing, descriptive matter and claims directed to the subject matter of the divisional application have been removed from the present disclosure after the divisional application was filed.

From a manufacturing standpoint, the problem in producing a precise spindle bearing of the ball type involves the production of truly coaxial races at the top and bottom of the spindle and at the top and bottom of the bearing sleeve. As will be explained fully hereinafter, the commercial importance of the present invention resides in the design of the races so that they can be made truly coaxial by simple manufacturing processes. The importance of these considerations is reflected in the fact that embodiments of the invention contemplated by the inventors afford and require no means for adjustment whatsoever. Thus, reliance is placed on precision of manufacture to obtain the desired result. It may be remarked that with such embodiments, the precision of the ball races is such that the limiting factor on accuracy is the precision with which the balls can be manufactured.

The invention will now be described by reference to the accompanying drawing, in which the single figure is a view chiefly in vertical axial section through a leveling head arranged to support a bearing constructed according to the invention. The bearing illustrated in this figure is an embodiment in which the upper bearing is of the combined thrust and radial type and is wholly indifferent to alignment and the lower bearing is of the preloaded radial type with cylindrical races.

The usual base plate is indicated at 6. This plate is intended to be mounted on a tripod not shown in the drawing. The base 6 has the usual central aperture with a bushing 7, affording the usual concave spherical bearing seat for the spherical head 8. This is formed on a nut 9. The nut 9 is threaded at 11 upon the tubular bearing sleeve 12. The threads 11 engage the sleeve 12 in an area above the lower end of the sleeve and above the lower internal bearing race hereinafter described. Sleeve 12 has at its upper end an external enlargement 13 which surrounds the upper bearing race and affords an external shoulder 14 some distance below this race. A spacing sleeve 15 surrounds the sleeve 12 and engages the shoulder 14. The sleeve 15 engages the top of the cruciform leveling head 16 while the nut 9 engages the lower side thereof. In this way the bearing sleeve 12, the sleeve 15 and the leveling head 16 are locked together by the nut 9 and so form a unitary structure. The stress exerted by the nut is so localized that there is no tendency to deform the sleeve 12. On the contrary, the sleeve is simply stressed in tension.

Pursuant to this same idea, the sleeve 15 has at its top a cylindrical extension 17, which is spaced from the head 13 on the sleeve 12 and is shouldered to receive and support the clamp 18, forming a part of a tangent screw mechanism, not illustrated in detail. The significant aspect of the construction is that the clamp 18 may be engaged and released without developing distorting stresses in the bearing sleeve 12. This follows from the fact that the clamp engages only the sleeve 15 and only that portion of that sleeve which is spaced from the sleeve 12.

The arms of the leveling head 16 are provided with the usual leveling screws 19, each of said screws having a universally mounted thrust head 21 which engages the upper surface of the base plate 6.

The lower end of the nut 9, i. e. the end below the spherical head 8, is closed by a screw plug 22.

The sleeve 12 has at its lower end a cylindrical precisely formed race 23 and has at its upper end within the portion 13 a concave spherical ball race 24. The geometrical center of the spherical ball race 24 is on the geometrical axis of the cylindrical ball race 23. The spindle 25 is formed with a true cylindrical surface 26 and an adjacent collar 27, whose lower face is a plane normal to the axis of the spindle. A series of balls 28, all of precisely the same diameter and all accurate spheres (at least to the extent that this is commercially practicable) are mounted between the lower face of collar 27, the cylindrical face 26 and the spherical race 24. As is clearly shown in the figure a radius of the spherical race 24 drawn through the point of contact of any ball 28 with the race 24 will bisect the re-entrant angle between the lower plane face of the collar 27 and the cylindrical surface 26. True rolling contact for all the balls 28 is thus assured.

It will be apparent that the bearing so formed is wholly indifferent to alignment of the spindle 27 because of the spherical configuration of the race 24 and the circular path in which the balls 28 must roll.

At the lower end of the spindle 25 is a cylindrical race 29 and between the race 29 and the race 23 on sleeve 12 is a circular series of bearing balls 31, all precisely spherical and all of the same diameter so far as this result is attainable. The balls 31 are spaced by an apertured retainer ring 32 whose form is not important. Retainer ring 32 is supported by nut 33 threaded on a reduced extension of spindle 25 below the race 29.

The frame of the level is mounted on the spindle 25 by means of threads 34 at the upper end of the spindle. The frame is screwed on until it seats against the upper surface of the collar 27.

The diameter of the balls 31 with reference to the internal diameter of race 23 and the diameter of race 29 is an important feature of the invention, for the balls must be preloaded, that is, mounted under compressive stress. Taking the illustrated example as typical, the race 23 is ground, lapped and honed to a diameter of 0.7501±0.000025. The race 29 is similarly precisely finished to a diameter of 0.4378±0.000025. The diameter of the balls is 0.15625±0.000011. Consequently the balls are under a compression amounting to 0.0001. This strain is well within the elastic limit of the ball and assures precise support of the spindle within the bearing sleeve. It would be possible to preload the balls even more highly but the suggested preloading is sufficient.

It will be observed that the bearing races in the sleeve 12 are so located that neither is stressed by the nut 9, and that the upper bearing is not stressed by the engagement and release of clamp 18.

The use of a concave spherical race 24 is advantageous, first, because it produces a bearing which is wholly indifferent to alignment and, second, because it is comparatively easy to manufacture. It might seem simpler to use a cone, but the generation of a true cone would require the use of a precision live center in the machine tool. A spherical race can be generated without the use of a precision live center. Consequently the concave spherical race 24 is economically preferable and geometrically better as well.

It is important to observe that a preloaded ball bearing having opposed cylindrical races is practically indifferent to alignment within that minute angular displacement of the spindle which could be caused by inaccuracies of manufacture. Misalignment converts the ball-path from a circle to an ellipse, but if the angle of misalignment is small, the difference between the major and minor axes of the ellipse is infinitesimal and less than the degree of preloading. Obviously, misalignment of the degree mentioned has no significant effect.

What is claimed is:

1. A spindle bearing structure for precise surveying instruments comprising in combination a spindle; an encircling sleeve; and two bearings one located adjacent each of the opposite ends of the spindle, each bearing comprising a circular series of balls which surround the spindle, and races therefor opposed to each other in pairs, the races of a pair being carried respectively by the spindle and the sleeve, each of said bearings having at least one race which is devoid of any ball-aligning groove whereby the bearings are rendered substantially indifferent to minor misalignment of the axes of the spindle and the sleeve, one of said bearings comprising opposed cylindrical races between which the balls are confined under a compression within the elastic limit of the balls, and the other bearing combining thrust bearing and radial bearing characteristics.

2. The combination with the bearing structure defined in claim 1 of supporting means which encircles said sleeve and stresses the sleeve in tension in the direction of its longitudinal axis within a portion thereof which lies wholly between said two bearings.

3. A spindle bearing structure for use in precise surveying instruments comprising in combination a spindle, an encircling sleeve and two longitudinally spaced bearings each interposed between the spindle and the sleeve, each bearing comprising a circular series of balls encircling the spindle, and races therefor opposed to each other and carried by and coaxial with the spindle and sleeve respectively, one of the sleeve-carried races having a concave spherical surface and the opposed spindle-carried race having two annular surfaces which form a re-entrant angle, each of said surfaces being engaged by the balls and the re-entrant angle being bisected by radii of the spherical race which pass through the points of contact of the balls with the spherical race, the other pair of spindle-and-sleeve-carried races being cylindrical and dimensioned to receive between them the bearing balls under compression within the elastic limit of the balls.

4. The combination defined in claim 3, in which the axis of the spindle is vertical and the axial thrust induced by gravity is sustained solely by the bearing first recited therein.

5. The combination defined in claim 3, in which the axis of the spindle is vertical and the bearing first recited in the claim is the upper bearing and alone resists the axial thrust induced by gravity.

HAROLD R. LARSEN.
DANIEL GURNEY.

REFERENCES CITED

The following references are of record in the file of this patent:

UNITED STATES PATENTS

| Number | Name | Date |
|---|---|---|
| 329,435 | Burton | Nov. 3, 1885 |
| 453,160 | Paoli | May 26, 1891 |
| 1,931,218 | Alsaker | Oct. 17, 1933 |
| 1,959,563 | Baker | May 22, 1934 |
| 2,164,051 | Brunson | June 27, 1939 |
| 2,208,014 | Brunson | July 16, 1940 |
| 2,280,057 | Brunson | Apr. 21, 1942 |
| 2,329,978 | Brunson | Sept. 21, 1943 |